July 11, 1933.  C. F. RAISCH  1,917,949
LUBRICATING APPARATUS
Filed Aug. 26, 1929  4 Sheets-Sheet 2
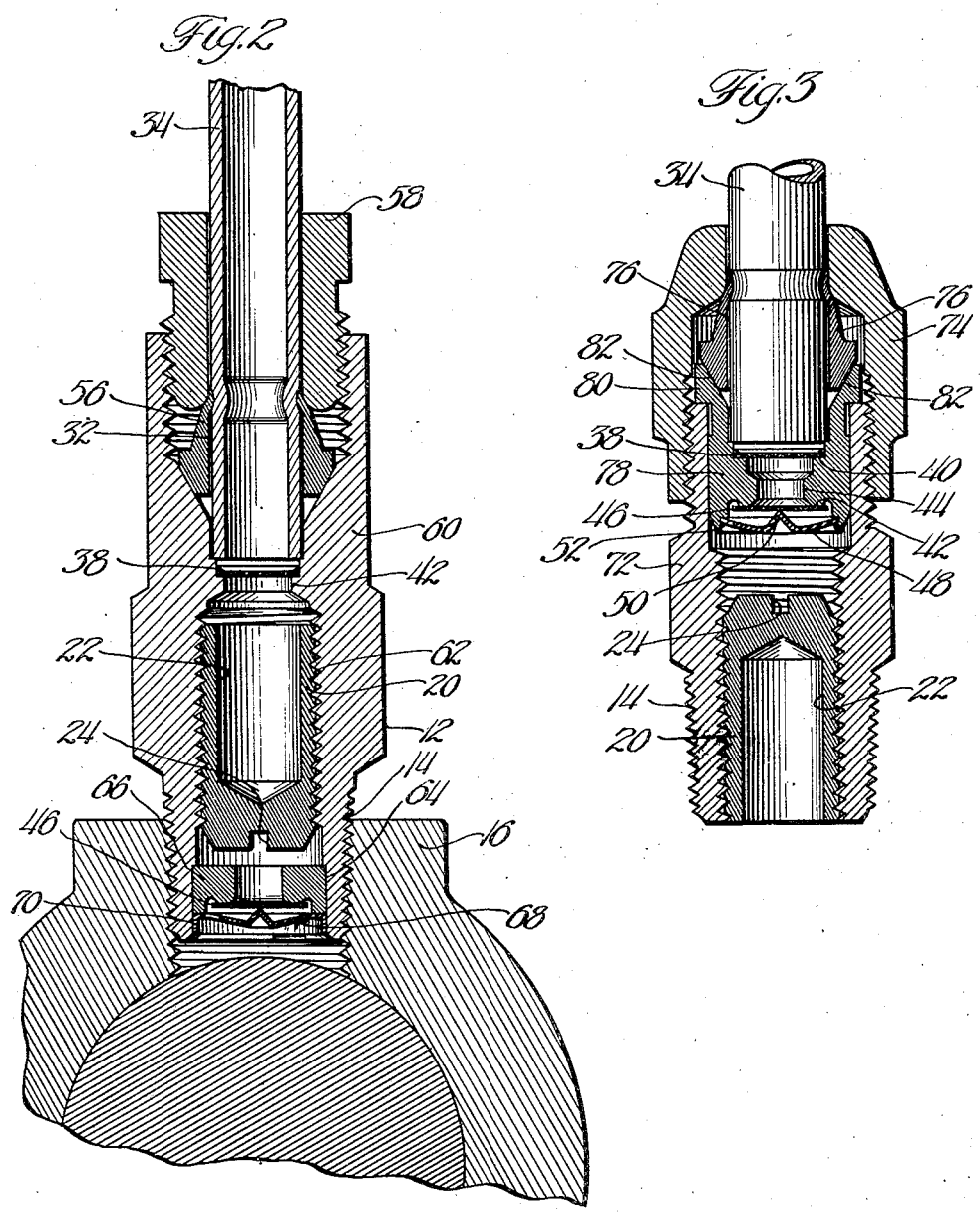
Inventor:
Charles F. Raisch
By Williams, Bradbury, McCaleb & Hinkle
Attys.

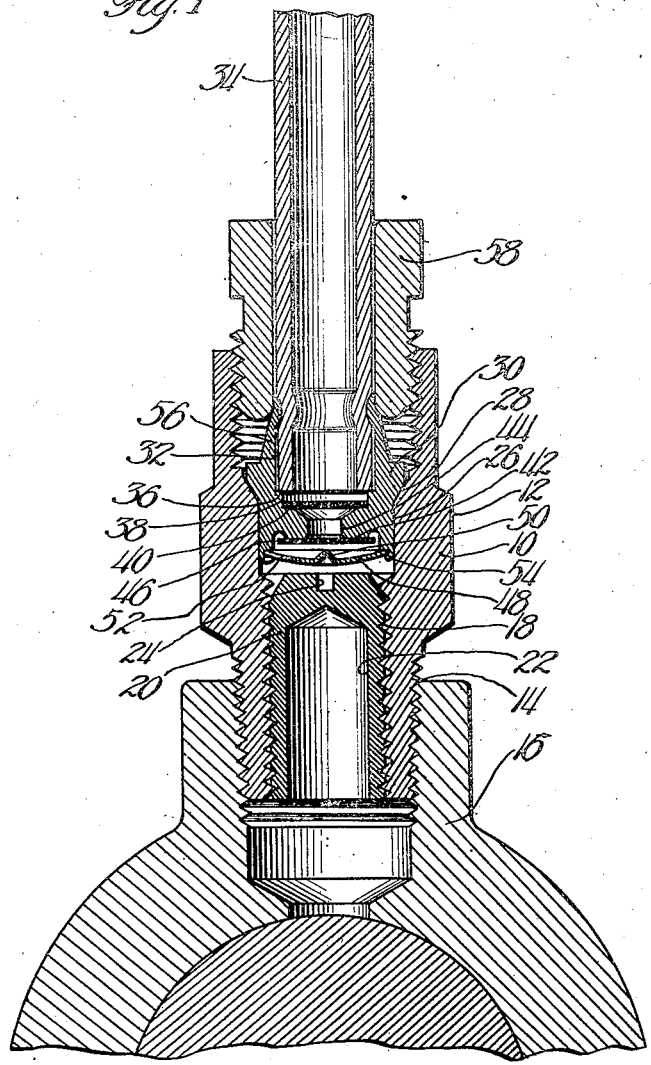

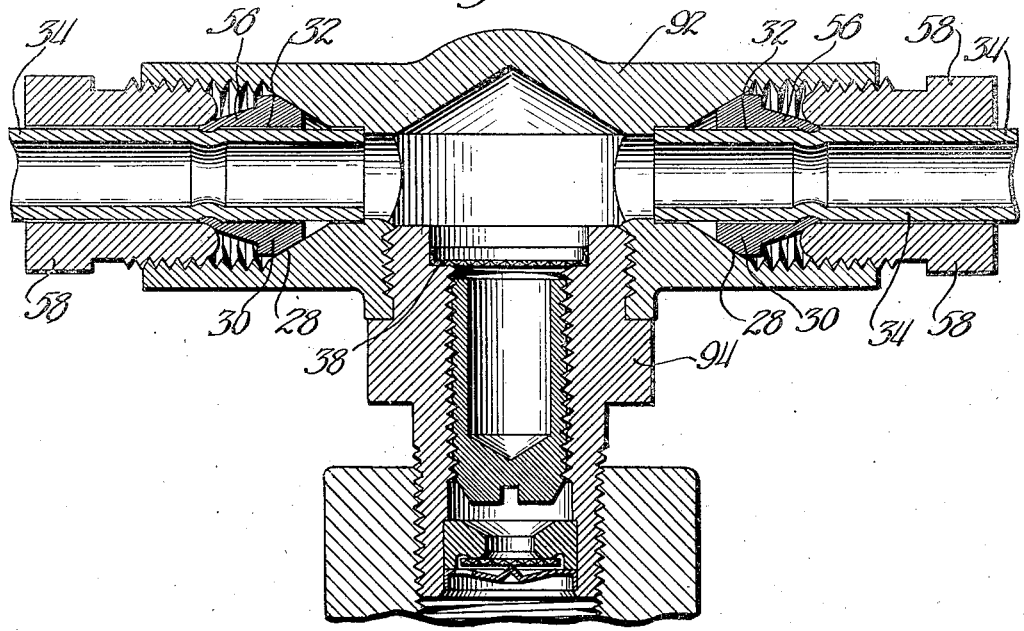
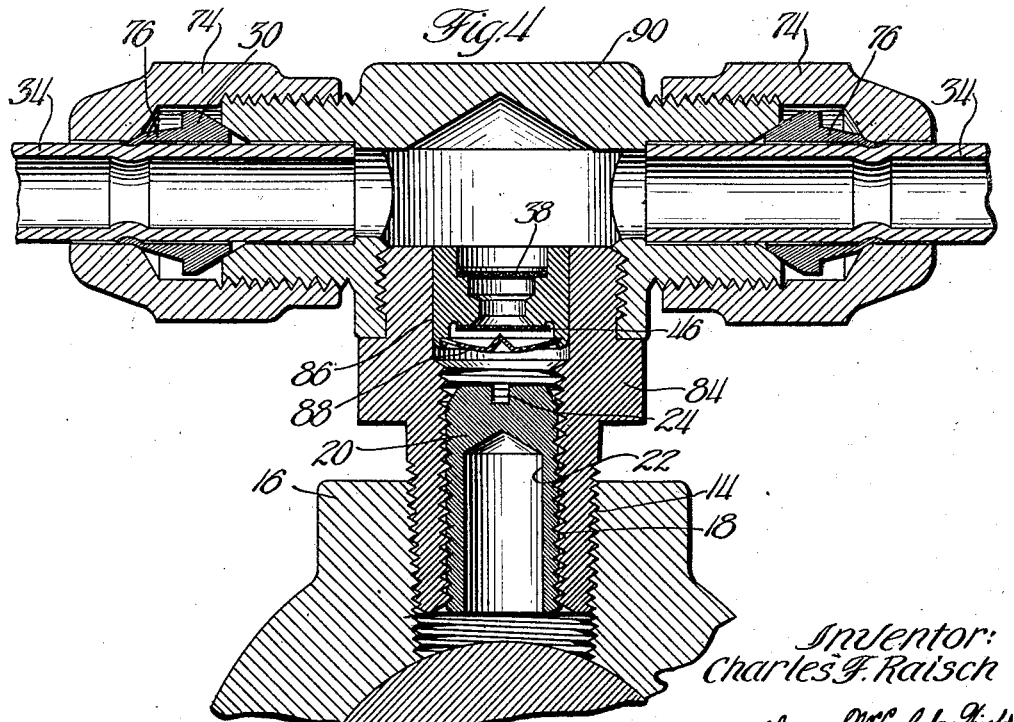

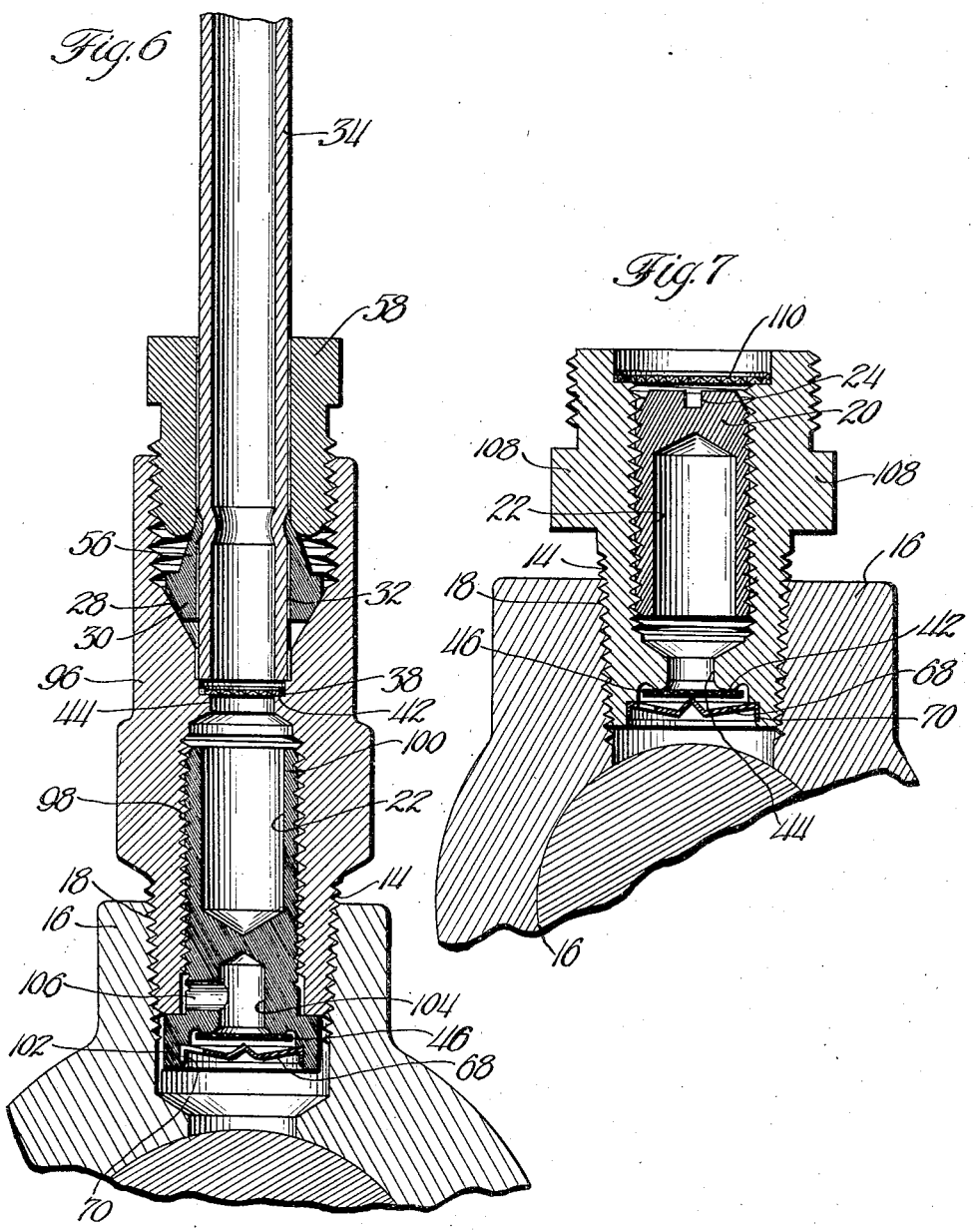

Patented July 11, 1933

1,917,949

UNITED STATES PATENT OFFICE

CHARLES F. RAISCH, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed August 26, 1929. Serial No. 388,332.

My invention relates, generally, to lubricating apparatus and more particularly to lubricant flow resistance units for use in centralized lubricating systems.

In one type of centralized lubricating system, such as is used for automotive vehicle chassis lubrication, a conveniently mounted pump is connected by a branched conduit system to the various bearings to be lubricated. Interposed in this conduit system are lubricant flow resistance units, usually one adjacent each of the bearings to be lubricated, these resistance units serving to apportion the lubricant among the various bearings and to so restrict the total flow from the conduit system as to substantially equalize the pressure throughout the system.

These resistance units also compensate for variations in the tightness of the fit of the bearings and are usually so restricted as to form a resistance to flow of lubricant which is many times greater than the resistance to flow of the lubricant into any one bearing. In this way the quantity of lubricant which will flow through a resistance unit is dependent to the greatest extent upon the resistance of the unit and is only slightly influenced by the resistance of the bearing.

It is also customary to incorporate a check valve in the resistance unit to prevent return flow of lubricant. Without this check valve there is a possibility that the lubricant in the conduit system would siphon out of the lowermost resistance unit and air be admitted through the uppermost resistance unit. By providing a check valve in each of the resistance units admission of air to the conduit system is prevented and thus the danger of having the lubricant siphon from the system is obviated.

It is an object of my invention to provide improved forms of resistance units particularly usable in systems as above described.

It is a further object of my invention to lower the cost of production of resistance units and to construct them so that their assembly is facilitated.

A further object is to provide an improved resistance unit which will require less material and which may be made shorter in length so as to be more readily attached to the bearing of the automotive vehicle.

Other objects will appear from the following description, reference being had to the accompanying drawings in which Figure 1 is a central vertical section of my improved form of resistance unit;

Figure 2 is a similar view showing a modification thereof;

Figure 3 is a similar view showing a second modification thereof;

Figure 4 is a central vetrical sectional view of a T connection resistance unit incorporating the main features of the modification shown in Figure 3;

Figure 5 is a view similar to Figure 4 incorporating the features of the modification shown in Figure 2;

Figure 6 is a central vertical sectional view of a third modification of my invention; and Figure 7 is a similar view of a fourth modification.

The resistance unit shown in Figure 1 comprises a body 10 having a hexagonal wrench engaging portion 12, the lower end of the body being externally threaded at 14 to co-operate with the threads in the oil hole of a bearing 16. The body has an axial bore, the lower end of which has a V-shaped thread 18 cut therein to receive a plug 20. The plug 20 has a shallow thread cut in its external surface for co-operation with the thread 18 and has an internal drill hole 22 to lighten its weight. The upper end of the plug 20 has a kerf 24 cut therein. The central portion 26 of the bore in the body 10 is cylindrical in shape and is flared at 28 to form a sealing abutment shoulder for a valve supporting member 30. The member 30 has an axial bore 32 formed therein to receive the end of a conduit 34, the extremity of which abuts against a shoulder 36 formed in the member 30. The member 30 has a counterbore 38 to receive a wire mesh strainer 40 which is preferably pressed in place. The lower end of the member 30 has a valve seat 42 formed thereon around a central passageway 44 drilled in the member 30.

A valve 46, preferably in the shape of a thin disc and formed of Empire cloth, a thin silk impregnated with a hardened oxidized linseed oil coating, or other suitable material, is normally held in the position shown in Figure 1 by the difference in pressure, capillary attraction or surface tension of the lubricant. The valve disc 46 is extremely flexible, impervious to the oil, and does not have a tendency to stick to its seat.

A valve retaining disc 48, having a central upwardly extending conical projection 50 and suitable apertures 52, is secured to the lower end of the member 30, preferably by crimping a small flange 54, formed at the lower end of the member 30, over the peripheral edge of the disc. The upper end 56 of the member 30 decreases in thickness so as to form a thin wall which may be deformed and pressed inwardly by a bushing 58 which is threaded into the upper end of the body 10.

In operation lubricant is supplied under pressure to the conduit 34 and is filtered through the strainer 40, unseats the valve 46, passes through the apertures 52 and thence around the helical path formed between the threads 18 and the threads of the plug 20. It will be understood that the drawing shows the parts much larger than their natural size and that this helical passageway is very minute and constitutes an extremely long and highly restricted passageway for the lubricant. The upwardly projecting point 50 on the valve retainer 48 prevents the disc 46 from entirely leaving its seat 42, the disc being sufficiently flexible so that only one side of it will leave the seat to permit passage of the oil while the other side is held by capillary attraction and also by the point 50. Since the flow through the resistance unit is very slight, it is possible that the valve 46 move from its seat only a distance measured in thousandths of an inch and that it is always in position quickly to return to the seat upon cessation of the flow of lubricant. The plug 20 may be made of any desired length and thus the resistance of the unit to flow of lubricant changed to suit the requirements of the individual bearing.

The unit may readily be assembled by first screwing the plug 20 in place and then forcing the valve supporting member 30 into its bore 26, the flared portion 28 of the bore co-operating with the complementary shaped portion of the member 30 to position the member 30 and to make a lubricant-tight, wedging seal between these parts. After the parts are thus assembled, the unit may be threaded into the oil hole of the bearing and the end of the conduit 34 inserted in the bore 32 and the bushing 58 screwed in place to deform the end 56 of the member 30 and also partially collapse the tube 34 so that the latter will be rigidly and securely locked to the unit.

The modification shown in Figure 2 comprises a body 60 having a threaded bore 62 to receive a plug 20. The lower end of the fitting has a counterbore 64 formed therein, into which a valve supporting member 66 is secured, preferably by a press fit. The valve disc 46 is limited against excessive movement from its seat, by a retainer 68 which has a downwardly projecting annular flange 70 resiliently engaging the wall of the bore 64. A conduit 34 is secured to the body by a coupling connection of well known construction. The remaining parts of the unit are similar to those shown in Figure 1 and previously described and similar reference characters have therefore been used, so that further description thereof is believed to be unnecessary.

The modification of my invention shown in Figure 3 comprises a body 72 which is externally threaded at both ends, the upper threaded portion being provided to receive a cap 74 which is adapted to engage a compressing ring 76 and thereby secure the conduit 34 to the unit. The valve supporting member 78 is similar to the corresponding part shown in Figure 1, except that it has an outwardly extending shouldered portion 80 which abuts against the upper end of the body 72 and has a frusto-conical recess 82 which receives the complementary shaped portion of the compression ring 76. This unit may be readily attached to the bearing to be lubricated by first screwing the body 72 into the oil hole of the bearing and then inserting the valve supporting member 78 and the conduit and thereafter screwing down the cap 74 so as to deform the conduit 34 and compression ring 76 and at the same time force the member 78 firmly into the upper end of the body 72. As the cap is tightened all contacting surfaces through which there might be a possibility of the leakage of oil are simultaneously pressed together so that the possibility of leakage is greatly minimized. If desired, the valve supporting member 78 may be forced into the body 72 prior to the installation of the unit upon a bearing.

The unit shown in Figure 4 is substantially the same as that shown in Figure 3 and is so constructed as to be readily used where a T connection is desired. In this unit the body 84 has a bore 86 in its upper end, into which the strainer and valve supporting member 88 is secured, preferably by a press fit. The upper end of the body 84 is threaded to receive a T-shaped member 90 which is suitably fitted to be connected to two conduits 34 in the usual manner.

The T resistance unit shown in Figure 5 is generally similar to that shown in Figure 2 and its operation is, of course, the same.

It is therefore believed to be unnecessary to describe this unit in detail, except that the T head 92 which is threaded onto the body 94 has its threads internally threaded to receive a well known type of metallic tube coupling.

The modification shown in Figure 6 comprises a body 96, the lower end of which has internal threads 98 to receive a plug 100. The plug 100 is provided with the half threads previously described and at its lower end has an enlarged portion 102 which is adapted to abut against the lower end of the body 96. The lower end of the plug has an axial bore 104 and a radial passageway 106 to permit flow of oil from the end of the helical passageway between the threads in the body of the threads on the plug to the bearing. The enlarged portion 102 is suitably formed to accommodate the valve and valve retainer in a manner similar to that previously described. The plug 100 is screwed into the body 96 until the head 102 presses tightly against the end of the body 96 to prevent air from leaking from the bearing into the conduit system.

The unit shown in Figure 7 comprises a body 108, the upper end of which is counterbored to form a seat for a wire mesh strainer 110 and is, as were the bodies in the previously described units, internally threaded for the plug 20. The valve seat 42 is, however, formed directly in the body 108 and the valve retainer 68 is secured at the lower extremity of the body. This unit is adapted to be used in connection with a T fitting of the type shown in Figures 4 and 5 and forms a compact, easily assembled and simple type of unit for the desired purposes.

It will be noted that in all of the above described forms of my invention the unit is composed of a small number of parts which may easily be made upon automatic screw machines and which may be very readily assembled. The parts are so constructed and designed that close tolerances are necessary only on very few of the dimensions of the parts, the parts requiring most accurate workmanship being the external diameter and threading of the plug and the threading of the bore of the body into which the plug is screwed, since these portions of the unit determine the size of the lubricant restricting passageway and hence the rate at which lubricant will flow through the unit at a given pressure.

While the devices herein shown and described are admirably adapted to fulfill the objects primarily stated, it is to be understood that it is not intended to confine the invention to the forms of embodiment herein disclosed, for the invention is susceptible of embodiment in various forms all coming within the scope of the claims which follow.

I claim:

1. A resistance unit for centralized lubricating systems comprising an internally threaded body, a plug having mutilated threads screwed into said body, a valve support and cage fitting in said body and having a tapering surface cooperating with a complemental surface in said body, said support having a bore to receive the end of a conduit, the wall surrounding said bore being of gradually decreasing thickness, and a bushing for deforming said wall and pressing it against a conduit.

2. A resistance unit for centralized lubricating systems comprising a body having a restricted lubricant passageway, a conduit receiving member secured within said body, said member having a strainer and check valve associated therewith, and a bushing threaded in said body and engaging a portion of said member, thereby to force said portion into lubricant tight sealing engagement with a conduit.

3. A resistance unit for centralized lubricating systems comprising an internally threaded body, a plug having mutilated threads screwed into said body, a valve seat member fitting in said body and having a tapering surface cooperating with a complemental surface in said body, said member having a bore to receive the end of a conduit, the wall surrounding said bore being of gradually decreasing thickness, a bushing for deforming said wall and pressing it against a conduit, a valve normally seated on said member, and a valve retainer secured to said member.

In witness whereof, I hereunto subscribe my name this 19th day of August, 1929.

C. F. RAISCH.